United States Patent [19]
Traumer

[11] Patent Number: 6,047,401
[45] Date of Patent: Apr. 11, 2000

[54] BANDANA WITH GOGGLES ATTACHMENT

[76] Inventor: Mark Traumer, 22 Gaffney Pl., Yonkers, N.Y. 10704-2207

[21] Appl. No.: 09/248,711

[22] Filed: Feb. 11, 1999

[51] Int. Cl.[7] ........................................................ A42B 1/06
[52] U.S. Cl. .................................... 2/10; 2/207; 2/209.13; 351/155
[58] Field of Search ............................ 2/10, 207, 209.13; 351/155

[56] References Cited

U.S. PATENT DOCUMENTS 4,520,510  6/1985  Daigle ......................................... 2/207

*Primary Examiner*—Diana Oleksa

[57] ABSTRACT

A head gear for covering the head and shielding the eyes of a user. The head gear includes a bandana member and a goggles member having an outer frame portion and a translucent eyes lens portion. The outer frame portion of the goggles member has an opposite pair of elongate flexible straps outwardly extending therefrom with the eyes lens portion of the goggles member interposed between the straps of the outer frame portion. The outer frame portion of the goggles member has a upper region located above the eyes lens portion of the goggles member which is attached to a side of the bandana member.

10 Claims, 2 Drawing Sheets

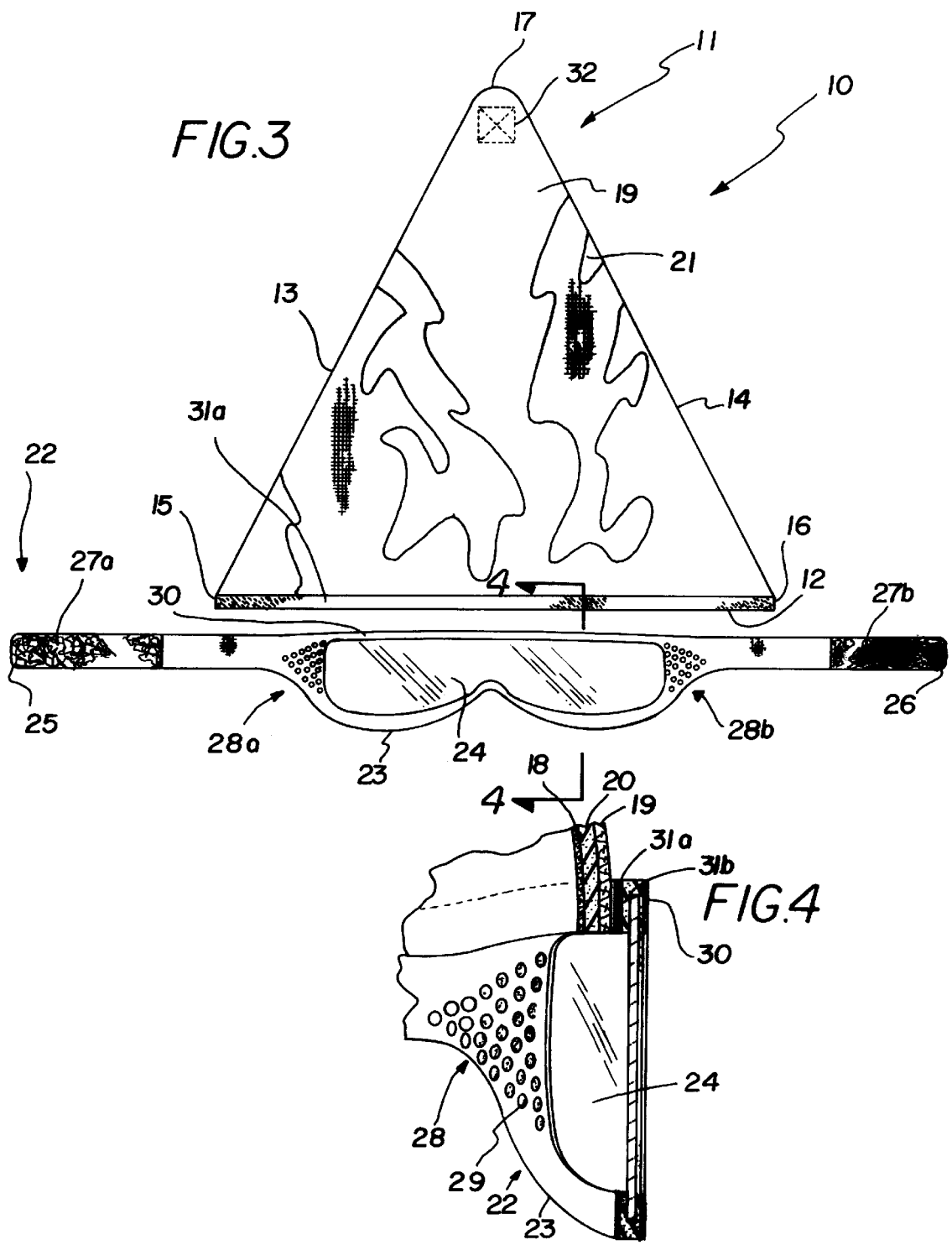

BANDANA WITH GOGGLES ATTACHMENT

BACKGROUND OF THE INVENTION

1. Field of the Invention

The present invention relates to articles worn on the head of a user and more particularly pertains to a new head gear for covering the head and shielding the eyes of a user.

2. Description of the Prior Art

The use of articles worn on the head of a user is known in the prior art. More specifically, articles worn on the head of a user heretofore devised and utilized arc known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,461,727 by Braswell-Moore; U.S. Pat. No. 5,617,589 by Lacore et al.; U.S. Pat. No. 2,288,423 by Root; U.S. Pat. No. 4,176,410 by Matthias; U.S. Pat. No. 5,421,037 by Schulze; and U.S. Pat. No. Des. 144,782 by Heinz.

While these devices fulfill their respective, particular objectives and requirements, the aforementioned patents do not disclose a new head gear. The inventive device includes a bandana member and a goggles member having an outer frame portion and a translucent eyes lens portion. The outer frame portion of the goggles member has an opposite pair of elongate flexible straps outwardly extending therefrom with the eyes lens portion of the goggles member interposed between the straps of the outer frame portion. The outer frame portion of the goggles member has a upper region located above the eyes lens portion of the goggles member which is attached to a side of the bandana member.

In these respects, the head gear according to the present invention substantially departs from the conventional concepts and designs of the prior art, and in so doing provides an apparatus primarily developed for the purpose of covering the head and shielding the eyes of a user.

SUMMARY OF THE INVENTION

In view of the foregoing disadvantages inherent in the known types of articles worn on the head of a user now present in the prior art, the present invention provides a new head gear construction wherein the same can be utilized for covering the head and shielding the eyes of a user.

The general purpose of the present invention, which will be described subsequently in greater detail, is to provide a new head gear apparatus and method which has many of the advantages of the articles worn on the head of a user mentioned heretofore and many novel features that result in a new head gear which is not anticipated, rendered obvious, suggested, or even implied by any of the prior art articles worn on the head of a user, either alone or in any combination thereof.

To attain this, the present invention generally comprises a bandana member and a goggles member having an outer frame portion and a translucent eyes lens portion. The outer frame portion of the goggles member has an opposite pair of elongate flexible straps outwardly extending therefrom with the eyes lens portion of the goggles member interposed between the straps of the outer frame portion. The outer frame portion of the goggles member has a upper region located above the eyes lens portion of the goggles member which is attached to a side of the bandana member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new head gear apparatus and method which has many of the advantages of the articles worn on the head of a user mentioned heretofore and many novel features that result in a new head gear which is not anticipated, rendered obvious, suggested, or even implied by any of the prior art articles worn on the head of a user, either alone or in any combination thereof.

It is another object of the present invention to provide a new head gear which may be easily and efficiently manufactured and marketed.

It is a further object of the present invention to provide a new head gear which is of a durable and reliable construction.

An even further object of the present invention is to provide a new head gear which is susceptible of a low cost of manufacture with regard to both materials and labor, and which accordingly is then susceptible of low prices of sale to the consuming public, thereby making such head gear economically available to the buying public.

Still yet another object of the present invention is to provide a new head gear which provides in the apparatuses and methods of the prior art some of the advantages thereof, while simultaneously overcoming some of the disadvantages normally associated therewith.

Still another object of the present invention is to provide a new head gear for covering the head and shielding the eyes of a user.

Yet another object of the present invention is to provide a new head gear which includes a bandana member and a goggles member having an outer frame portion and a translucent eyes lens portion. The outer frame portion of the goggles member has an opposite pair of elongate flexible straps outwardly extending therefrom with the eyes lens portion of the goggles member interposed between the straps of the outer frame portion. The outer frame portion of the goggles member has a upper region located above the eyes lens portion of the goggles member which is attached to a side of the bandana member.

Still yet another object of the present invention is to provide a new head gear that includes a bandana detachably attached to goggles so that the bandana may be interchanged with other bandanas having different designs thereon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic plan view of the present invention with the bandana member detached from the goggles member.

FIG. 4 is a schematic cross sectional view of the present invention taken from line 4—4 of FIG. 3 with the bandana member attached to the goggles member.

DESCRIPTION OF THE PREFERRED EMBODIMENT

Figure 1:
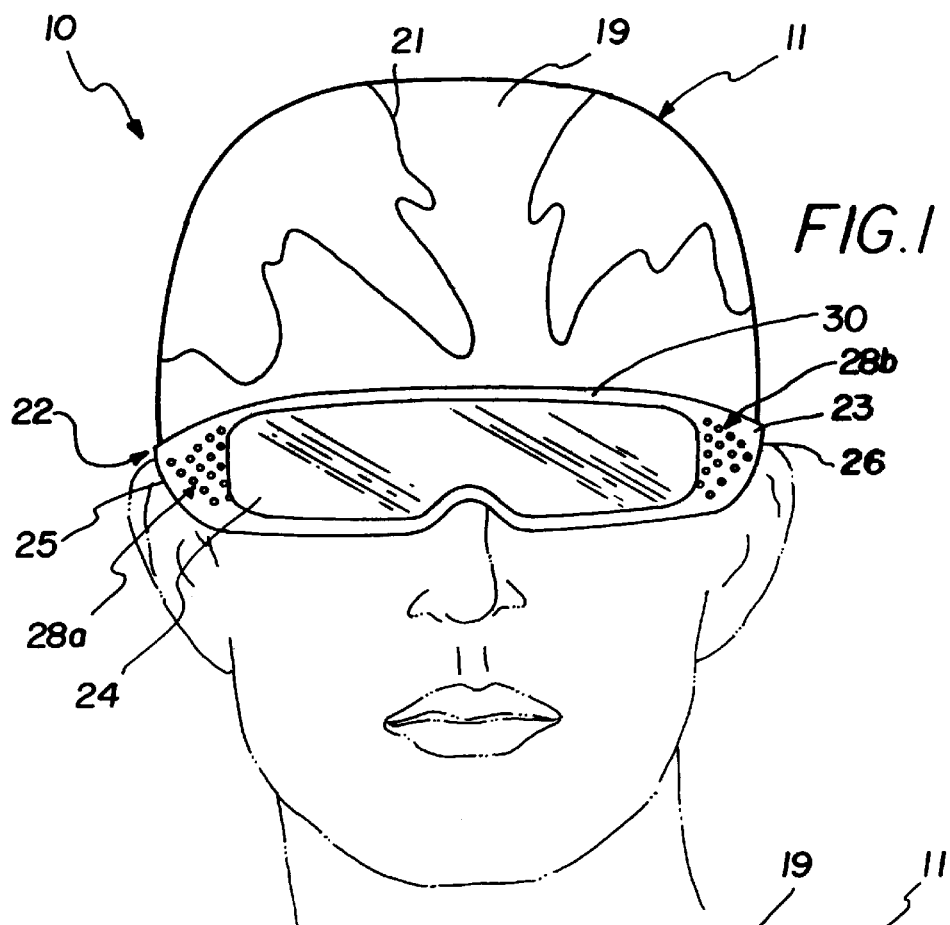
FIG. 1 is a schematic front view of a new head gear in use being worn on the head of a user according to the present invention.

With reference now to the drawings, and in particular to FIGS. 1 through 4 thereof, a new head gear embodying the principles and concepts of the present invention and generally designated by the reference numeral 10 will be described.

As best illustrated in FIGS. 1 through 4, the head gear 10 generally comprises a bandana member and a goggles member having an outer frame portion and a translucent eyes lens portion. The outer frame portion of the goggles member has an opposite pair of elongate flexible straps outwardly extending therefrom with the eyes lens portion of the goggles member interposed between the straps of the outer frame portion. The outer frame portion of the goggles member has a upper region located above the eyes lens portion of the goggles member which is attached to a side of the bandana member.

Figure 2:
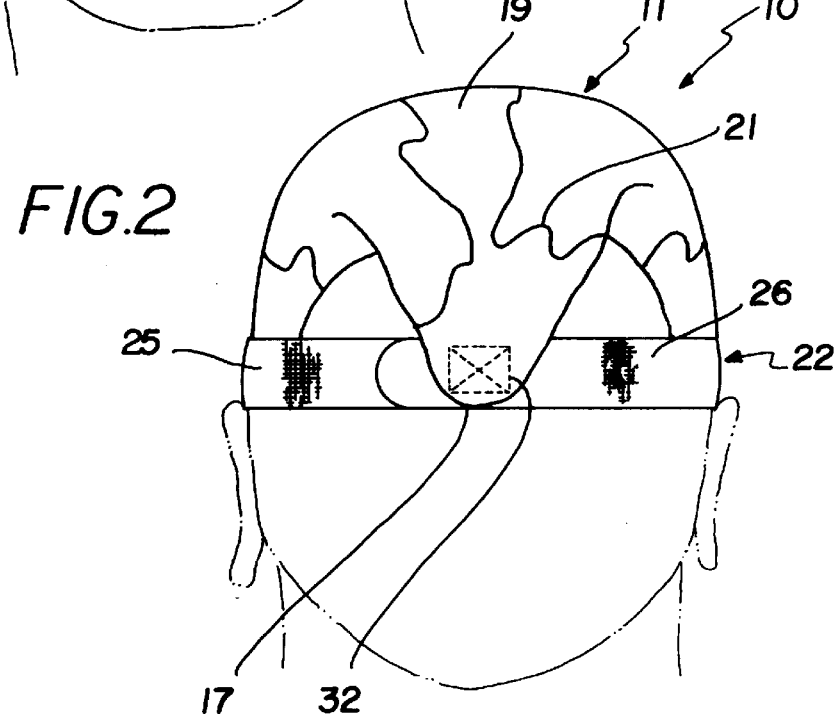
FIG. 2 is a schematic rear view of the present invention in use on the head of the user.

In use, the head gear 10 is designed for wear of a user's head to cover the head of a user and shield the eyes of the user from sunlight and glare as illustrated in FIGS. 1 and 2. In closer detail, the head gear comprises a generally triangular flexible bandana member 11 has a plurality of generally straight sides 12,13,14 and a plurality of vertices 15,16,17.

As best illustrated in FIG. 4, the bandana member preferably comprises substantially coextensive inner and outer layers 18,19 and a middle layer 20 interposed between the inner and outer layers of the bandana member. The inner and outer layers of the bandana member are coupled together along their outer perimeters so that the middle layer of the bandana member is substantially enclosed therebetween.

Ideally, the inner and outer layers of the bandana member each comprise a flexible fabric material and the middle layer of the bandana member comprises a flexible resiliently deformable formed material. Preferably, the middle layer of the bandana member has a thickness greater than either of the inner and outer layers of the bandana member. Ideally, the outer layer of the bandana member has a decorative pattern 21 or a design thereon so that the pattern or design is displayed when worn on the head of the user.

In use, the bandana member is designed for wear on a head of a user to cover the head of the user as illustrated in FIGS. 1 and 2. A first of the sides 12 of the bandana member is designed for placement adjacent a forehead of the user. The first side of the bandana member is interposed between a first and a second of the vertices 15,16 of the bandana member. A third 17 of the vertices of the bandana member is located opposite the first side of the bandana member. As shown in FIG. 2, the third vertex of the bandana member is designed for positioning adjacent a back portion of the head of the user opposite the forehead of the user.

The goggles member 22 has an outer frame portion 23 and a translucent eyes lens portion 24 mounted to the outer frame portion. With reference to FIG. 1, the goggles member is designed for wear on the face of the user such that the eyes lens portion of the goggles member is positioned over the eyes of the user.

The eyes lens portion preferably comprises a tinted translucent material to shield the eyes of the user from glare and sunlight. The outer frame portion of the goggles member preferably comprises a flexible and resiliently elastic material such as a flexible elastic neoprene material.

The outer frame portion of the goggles member has an opposite pair of elongate flexible straps 25,26 outwardly extending therefrom. The eyes lens portion of the goggles member is interposed between the straps of the outer frame portion. As best shown in FIG. 2, the straps of the goggles member are designed for wrapping around the back of the head of the user to secure the goggles member to the head of the user. Each of the straps terminates at a free end. The free ends of the straps are detachably attached together as illustrated in FIG. 2. Preferably, a hooks and loops fastener 27a,27b provided on the straps detachably attaches the free ends of the straps together.

The outer frame portion of the goggles member preferably has two sets of ventilation apertures 28a, 28b therethrough located adjacent the eyes lens portion of the goggles member such that the eyes lens portion is interposed between the two sets of ventilation apertures. With reference to FIG. 4, the sets of the ventilation apertures each comprise a plurality of spaced apart ventilation apertures 29 arranged in a plurality of rows forming a generally triangular shape. In use, the ventilation apertures are designed for letting air and moisture pass to the back face of the eye lens portion to keep the eyes lens portion from fogging up during use.

The outer frame portion of the goggles member has a upper region 30 located above the eyes lens portion of the goggles member. The upper region of the outer frame portion is detachably attached to the first side of the bandana member. As best illustrated in FIG. 4, preferably, a hooks and loops fastener detachably attaches the upper region of the outer frame portion to the first side of the bandana member. This hooks and loops fastener has a pair of complementary portions 31a,31b detachably attached to one another. A first of the complementary portions is provided in a strip along the first side of the bandana member on the outer layer of the bandana member. A second of the complementary portions is provided in a strip along the upper region of the outer frame portion on a back face of the outer frame portion above the eyes lens portion of the goggles member.

In the preferred embodiment, with reference to FIG. 2, the third vertex of the bandana member is detachably attached to one of the straps of the outer frame portion of the goggles member by a hooks and loops fastener 32 provided on the inner layer of the bandana member adjacent the third vertex and on the attached strap.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An article of headwear, comprising:
    a bandana member having a plurality of sides and a plurality of vertices;
    a goggles member having an outer frame portion and a translucent eyes lens portion;
    said outer frame portion of said goggles member having an opposite pair of elongate flexible straps outwardly extending therefrom, said eyes lens portion of said goggles member being interposed between said straps of said outer frame portion;
    each of said straps having a free end, said free ends of said straps being attached together;
    said outer frame portion of said goggles member having a upper region located above said eyes lens portion of said goggles member; and
    said upper region of said outer frame portion being attached to a first of said sides of said bandana member.

2. The article of headwear of claim 1, wherein said bandana member comprises substantially coextensive inner and outer layers and a middle layer interposed between said inner and outer layers of said bandana member.

3. The article of headwear of claim 2, wherein said inner and outer layers of said bandana member each have an outer perimeter, said inner and outer layers of said bandana member being coupled together along said outer perimeters of said inner and outer layers such that said middle layer of said bandana member is substantially enclosed therebetween.

4. The article of headwear of claim 2, wherein said inner and outer layers of said bandana member each comprise a flexible fabric material, and wherein said middle layer of said bandana member comprises a flexible resiliently deformable formed material.

5. The article of headwear of claim 1, wherein said outer frame portion of said goggles member comprises a flexible and resiliently elastic material.

6. The article of headwear of claim 1, wherein a hooks and loops fastener provided on said straps detachably attaches said free ends of said straps together.

7. The article of headwear of claim 1, wherein said outer frame portion of said goggles member has two sets of ventilation apertures therethrough located adjacent said eyes lens portion of said goggles member such that said eyes lens portion is interposed between said two sets of ventilation apertures.

8. The article of headwear of claim 7, wherein said sets of said ventilation apertures each comprise a plurality of spaced apart ventilation apertures arranged in a plurality of rows forming a generally triangular shape.

9. The article of headwear of claim 1, wherein a hooks and loops fastener detachably attaches said upper region of said outer frame portion to said first side of said bandana member, wherein said hooks and loops fastener has a pair of complementary portions detachably attached to one another, wherein a first of said complementary portions is provided in a strip along said first side of said bandana member on an outer layer of said bandana member, and wherein a second of said complementary portions is provided in a strip along said upper region of said outer frame portion on a back face of said outer frame portion.

10. An article of headwear, comprising:
    a generally triangular flexible bandana member having a plurality of generally straight sides and a plurality of vertices;
    said bandana member comprising substantially coextensive inner and outer layers and a middle layer interposed between said inner and outer layers of said bandana member;
    said inner and outer layers of said bandana member each having an outer perimeter, said inner and outer layers of said bandana member being coupled together along said outer perimeters of said inner and outer layers such that said middle layer of said bandana member is substantially enclosed therebetween;
    said inner and outer layers of said bandana member each comprising a flexible fabric material;
    said middle layer of said bandana member comprising a flexible resiliently deformable formed material;
    said bandana member being adapted for wear on a head of a user to cover the head of the user;
    a first of said sides of said bandana member being adapted for placement adjacent a forehead of the user, said first side of said bandana member being interposed between a first and a second of said vertices of said bandana member;
    a third of said vertices of said bandana member being located opposite said first side of said bandana member, said third vertex of said bandana member being adapted for positioning adjacent a back portion of the head of the user opposite the forehead of the user;
    a goggles member having an outer frame portion and a translucent eyes lens portions;
    said goggles member being adapted for wear on the face of the user such that said eyes lens portion of said goggles member is positioned over the eyes of the user;

said outer frame portion of said goggles member comprising a flexible and resiliently elastic material;

said outer frame portion of said goggles member having an opposite pair of elongate flexible straps outwardly extending therefrom, said eyes lens portion of said goggles member being interposed between said straps of said outer frame portion;

said straps of said goggles member being adapted for wrapping around the back of the head of the user to secure said goggles member to the head of the user;

each of said straps having a free end, said free ends of said straps being attached together;

wherein a hooks and loops fastener provided on said straps detachably attaches said free ends of said straps together;

said outer frame portion of said goggles member having two sets of ventilation apertures therethrough located adjacent said eyes lens portion of said goggles member such that said eyes lens portion is interposed between said two sets of ventilation apertures;

said sets of said ventilation apertures each comprising a plurality of spaced apart ventilation apertures arranged in a plurality of rows forming a generally triangular shape;

said outer frame portion of said goggles member having a upper region located above said eyes lens portion of said goggles member;

said upper region of said outer frame portion being detachably attached to said first side of said bandana member;

wherein a hooks and loops fastener detachably attaches said upper region of said outer frame portion to said first side of said bandana member;

said hooks and loops fastener detachably attaching said upper region of said outer frame portion to said first side of said bandana member having a pair of complementary portions detachably attached to one another;

a first of said complementary portions being provided in a strip along said first side of said bandana member on said outer layer of said bandana member; and a second of said complementary portions being provided in a strip along said upper region of said outer frame portion on a back face of said outer frame portion.

* * * * *